United States Patent
Buryak et al.

(10) Patent No.: US 8,543,576 B1
(45) Date of Patent: Sep. 24, 2013

(54) CLASSIFICATION OF CLUSTERED DOCUMENTS BASED ON SIMILARITY SCORES

(75) Inventors: Kirill Buryak, Sunnyvale, CA (US); Jun Peng, San Ramon, CA (US); Glenn M. Lewis, Costa Mesa, CA (US); Nadav Benbarak, Boston, MA (US); Aner Ben-Artzi, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/479,188

(22) Filed: May 23, 2012

(51) Int. Cl.
*G06F 17/30* (2006.01)
(52) U.S. Cl.
USPC .......................................... 707/737; 707/740
(58) Field of Classification Search
USPC .................................................. 707/737, 740
See application file for complete search history.

(56) References Cited

U.S. PATENT DOCUMENTS

| | | | |
|---|---|---|---|
| 2003/0233350 A1* | 12/2003 | Dedhia et al. | 707/3 |
| 2010/0082626 A1* | 4/2010 | Tsai et al. | 707/737 |
| 2010/0318526 A1* | 12/2010 | Nakazawa et al. | 707/749 |

* cited by examiner

*Primary Examiner* — Baoquoc N To
(74) *Attorney, Agent, or Firm* — Remarck Law Group PLC

(57) ABSTRACT

Among other disclosed subject matter, a computer-implemented method that includes receiving a set of clusters of documents and calculating a similarity score for each cluster wherein the similarity score is based at least in part on features included in the documents in the cluster and indicates a measure of similarity of the documents in the cluster. For each cluster associated with a respective similarity score greater than a first threshold, identifying the cluster as satisfying a quality assurance requirement. For each cluster associated with a respective similarity score less than a second threshold, identifying the cluster as failing the quality assurance requirement. For each cluster associated with a similarity score less than or equal to the first threshold value and greater than or equal to the second threshold value, reviewing at least a subset of documents in the cluster to determine whether the cluster satisfies the quality assurance requirement.

24 Claims, 5 Drawing Sheets

| Cluster Name | Similarlity Score | Cluster Passed Quality Review? |
|---|---|---|
| Cluster 145 | 1.794429 | Yes |
| Cluster 143 | 1.793566 | Yes |
| Cluster 144 | 1.793414 | Yes |
| Cluster 146 | 1.792979 | Yes |
| Cluster 141 | 1.79252 | Yes |
| Cluster 142 | 1.79247 | Yes |
| Cluster 140 | 1.792328 | No |
| ... | | |
| Cluster 120 | 1.792077 | No |
| Cluster 9 | 1.79191 | Yes |
| Cluster 59 | 1.79173 | Yes |
| ... | | |
| Cluster 90 | 1.791417 | Yes |
| Cluster 9 | 1.791138 | No |
| Cluster 5 | 1.790666 | No |
| Cluster 7 | 1.790494 | No |
| Cluster 8 | 1.79033 | No |
| Cluster 1 | 1.79031 | No |
| Cluster 6 | 1.790083 | No |
| Cluster 3 | 1.789904 | No |
| Cluster 2 | 1.789624 | No |
| Cluster 4 | 1.789102 | No |

High Quality Threshold
Value = 1.792328

Low Quality Threshold
Value = 1.791138

FIG. 2

CLASSIFICATION OF CLUSTERED DOCUMENTS BASED ON SIMILARITY SCORES

BACKGROUND

This specification relates to information management.

Organizations and businesses can receive a large number of messages from customers, potential customers, users and/or other people. For example, a business and/or organization can receive documents from its customers and potential customers, such as email messages, messages from online forums, e.g., support forums or message boards, and other types of documents. These documents can be related to a variety of different topics or issues. For example, the documents can be related to problems experienced by a user and can include a request for assistance to solve the problems.

SUMMARY

This document describes techniques for information management, including clustering of inbound communications to an organization or business.

In general, one innovative aspect of the subject matter described in this specification can be embodied in methods that include receiving a set of clusters of documents. The methods include calculating a similarity score for each cluster wherein the similarity score is based at least in part on features included in the documents in the cluster and indicates a measure of similarity of the documents in the cluster. The methods include, for each cluster associated with a respective similarity score greater than a first threshold, identifying the cluster as satisfying a quality assurance requirement. The methods include, for each cluster associated with a respective similarity score less than a second threshold, identifying the cluster as failing the quality assurance requirement. The second threshold is less than the first threshold. The methods include, for each cluster associated with a similarity score less than or equal to the first threshold value and greater than or equal to the second threshold value, reviewing at least a subset of documents in the cluster to determine whether the cluster satisfies the quality assurance requirement. The methods include associating a label with each cluster in the set of clusters. The label indicates whether the cluster satisfied the quality assurance requirement.

These and other embodiments can each optionally include one or more of the following features. The method can include ranking the set of clusters based on the similarity scores associated with the clusters before identifying the clusters as satisfying the quality assurance requirement and before identifying the clusters as failing the quality assurance requirement. Identifying the cluster as satisfying the quality assurance requirement can include identifying the cluster as satisfying the quality assurance requirement without reviewing a subset of documents in the cluster to identify the cluster as satisfying the quality assurance requirement. Identifying the cluster as failing the quality assurance requirement can include identifying the cluster as failing the quality assurance requirement without reviewing a subset of documents in the cluster to identify the cluster as failing the quality assurance requirement. Reviewing at least a subset of documents in the cluster to determine whether the cluster satisfies the quality assurance requirement can include determining a topic purity score and a confidence interval score associated with the cluster. The topic purity score is based at least in part on the subset of documents in the cluster and can include a percentage of the documents in the cluster that are related to the same topic. The confidence interval score is based at least in part on the subset of documents and comprises an indication of the reliability of the topic purity score. The quality assurance requirement can include a topic purity requirement and a confidence interval requirement. Reviewing at least a subset of documents in the cluster to determine whether the cluster satisfies the quality assurance requirement can include comparing the topic purity score associated with the cluster and the confidence interval score associated with the cluster to the topic purity requirement and the confidence interval requirement, respectively, to determine whether the cluster satisfies the quality assurance requirement. The topic purity requirement is substantially 80% and the confidence interval requirement is substantially 80%. The method can include prior to receiving the set of clusters of documents, determining the first and second thresholds, wherein determining the first and second thresholds includes receiving a second set of clusters of documents; for each cluster in the second set of clusters: determining the topic purity score and the confidence level associated with the cluster, wherein the topic purity score comprises a percentage of the documents in the cluster that are related to the same topic and wherein the confidence interval score includes an indication of the reliability of the topic purity score; and for each cluster, calculating a similarity score based at least in part on features included in the documents; ranking the second set of clusters based on the similarity score; analyzing the second set of clusters in a descending order to determine the first threshold value, wherein the first threshold value corresponds to a similarity score associated with a first cluster that fails the quality assurance requirement; and analyzing the second set of clusters in an ascending order to determine the second threshold value, wherein the second threshold value corresponds to a similarity score associated with the first cluster that satisfies the quality assurance requirement.

Particular embodiments of the subject matter described in this specification can be implemented so as to realize none, one or more of the following advantages. For example, the number of clusters that are reviewed to determine whether they satisfy a quality assurance requirement can be reduced. This can allow for faster clustering of documents. In addition, the number of reviewers can be reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates an example ranking of clusters.

Like reference numbers and designations in the various drawings indicate like elements.

DETAILED DESCRIPTION

In general, this document describes a system (and methods) that receives and clusters user documents (e.g., user feedback documents or requests for support). A similarity score can be calculated for each cluster. The similarity score (e.g., a mutual information value) can provide an indication or a measure of the similarity of the documents in the cluster. The clusters can be ranked based on the similarity scores and a high quality threshold and low quality threshold can be determined based on the similarity scores and a quality assurance requirement. The high quality threshold is greater than the low quality threshold.

After the first and second thresholds are determined, additional user documents can be received and added to the existing clusters. In some implementations new clusters can be formed. The similarity score can be calculated for each of the new/old clusters. The clusters can be ranked according to the similarity scores. The system can determine that each of the clusters having a score greater than the high quality threshold satisfies the quality assurance requirement. The system can determine that each of the clusters having a similarity score less than the low quality threshold does not satisfy the quality assurance requirement. In some implementations, each cluster having a score that is less than or equal to the high quality threshold and greater than or equal to the low quality threshold can be further analyzed to determine whether the cluster satisfies the quality assurance requirement.

Figure 1:
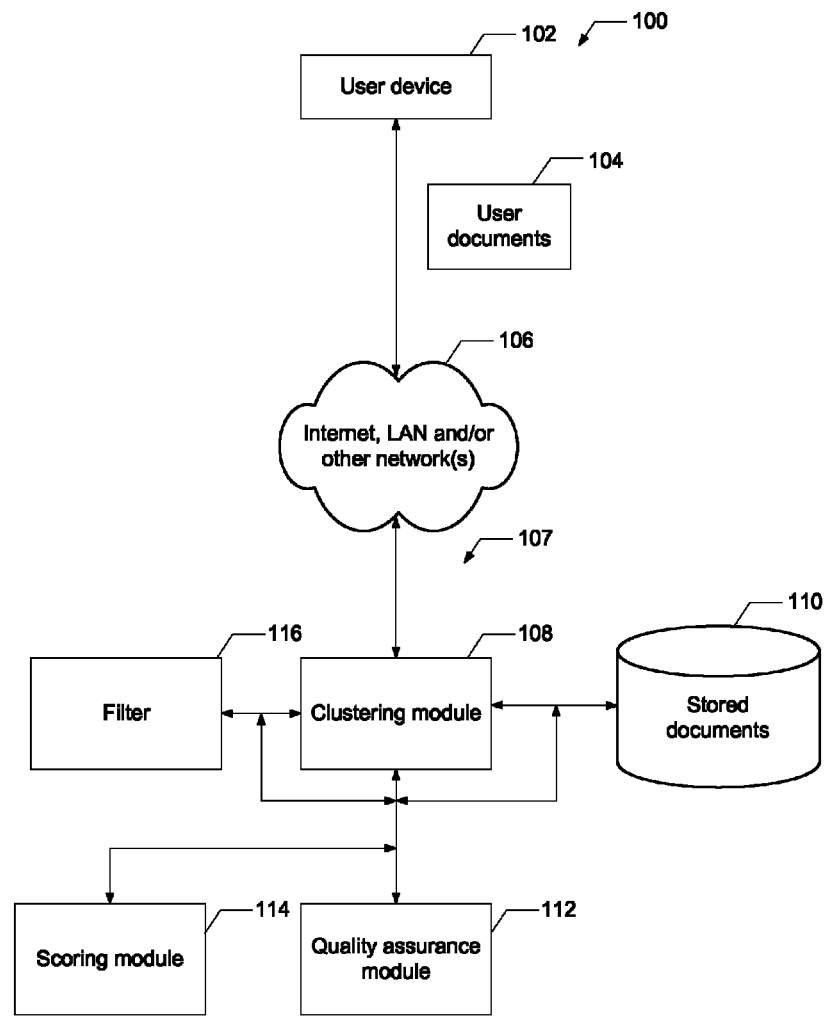
FIG. 1 illustrates an example system to cluster and review documents.

FIG. 1 illustrates an example system 100 to cluster and review documents. The system 100 includes a user device 102, one or more user documents 104, a network 106 and a document organization system 107 that includes a clustering module 108, a stored documents database 110, a quality assurance module 112, a scoring module 114 and a filter 116. The user device 102 can be any appropriate data processing apparatus. For example, the user device 102 can be a personal computer, a laptop, a mobile communication device, a personal digital assistant or a smart phone. Although FIG. 1 illustrates a single user device 102, multiple user devices can be included in system 100. The user device 102 can include various software applications such as web browsers or word processors that can be used to create user documents 104.

The user documents 104 can be any appropriate type of document that includes user input, feedback or support requests. For example, the user document 104 can include a request for help relating to a user's login problems, technical support issues or billing problems. The user documents 104 can include HTML forms, email messages, online forum posts/entries, word processing documents, bug tracking messages/documents, help desk messages, portable document format (PDF) documents and/or other types of documents transmitted, for example, from the user device 102. The user documents 104 can be transmitted to the document organization system 107.

The network 106 can be any type of network such as a local area network (LAN), wide area network (WAN), the Internet, or a combination thereof. The network 106 facilitates connectivity between the user device 102 and the document organization system 107.

In general, the document organization system 107 can receive the user documents 104 and organize the user documents 104 according to topics or issues associated with the user documents 104. The document organization system 107 includes a clustering module 108, a stored documents database 110, a quality assurance module 112, a scoring module 114 and a filter 116.

The clustering module 108 can be configured to receive user documents 104 and form clusters of user documents according to the topic or issue associated with the user documents 104 (e.g., billing issues, technical support requests, requests for instructions to use a particular feature, etc.). For example, the clustering module 108 can access the stored documents database 110 and analyze a set of stored user documents 104 to identify similarities among the documents. In some implementations, the clustering module 108 attempts to group user documents 104 in various groupings until an optimal or near optimal grouping is identified. For example, the clustering module 108 can attempt to group the user documents 104 such that substantially all user documents in a particular cluster are related to or describe a similar topic or issue (e.g., 85%, 95% of the documents are related to the same issue). The clusters can be associated with a label that indicates the topic or issue associated with the majority of user documents included in the cluster. In addition, the user documents can be associated with labels that indicate the topic or issue associated with the user document. The clustering module 108 can store the clusters of user documents in the stored documents database 110 (e.g., any appropriate type of database, memory or storage device) or can provide the clusters of user documents to the quality assurance module 114.

The clustering module 108 can use various hierarchical or partitional algorithms to analyze and identify the co-occurrence of features or keywords across the user documents 104 (e.g., words, phrases, numbers or text strings that are used as a basis for forming the clusters). For example, the clustering module 108 can use a distributed exchange algorithm, a k-means clustering algorithm or a quality threshold ("QT") algorithm to form the clusters.

In some implementations, the clustering module 108 can identify a feature set before clustering the user documents 106. For example, the clustering module 108 can determine the feature set based on a domain-specific dictionary. The domain-specific dictionary can be derived from documents that correspond to the domain (e.g., technical support manuals, billing support documents, product marketing or instructional documents, etc.), for example, by performing a search of the documents to identify commonly occurring words, phrases, codes, numbers, etc. In some implementations, an information retrieval/text mining algorithm, such as a term frequency-inverse document frequency algorithm, can be applied to the user documents 104 to identify statistically relevant features or keywords. The information retrieval/text mining algorithm can be applied before clustering the user documents 104.

In some implementations, the clustering module 108 can be configured such that common words that have little or minimal value as a feature can be excluded from being identified as a feature (i.e., blacklisted). For example, common blacklisted terms include stop words (e.g., "the," "and," "a," etc.), salutations (e.g., "Dear," "Hello," etc.) and boilerplate text (e.g., "From:," "To:," "Subject:," "Cc:", etc.).

The quality assurance module 112 can access or receive the clusters of user documents and determine whether each user cluster satisfies a quality assurance requirement. For example, for each cluster of user documents, the quality assurance module 112 can randomly or pseudo-randomly select a subset of user documents from the cluster of documents and determine how many of the user documents included in the subset are related to the same topic or issue. The subset of user documents can include a predetermined number of user documents 104 that are randomly or pseudo-randomly selected from the cluster of user documents. The predetermined number of user documents can be any number of documents (e.g., 10, 20, 100) or any percentage of the total number of documents in the cluster (e.g., 10%, 50%, 80%) but is less than the total number of documents in the cluster.

In some implementations, a user interacting with the quality assurance module 112 or the document organization system 107 can determine how many of the user documents included in the subset are related to the same topic or issue. The user interacting with the quality assurance module 112 or the document organization system 107 can analyze the subset of documents and determine a topic purity score associated with the cluster. For example, the user can analyze each user document 104 in the subset of documents and determine the percentage of the user documents 104 that are related to the same topic or issue. As an example, the subset of user documents can include twenty documents of which fourteen documents are related to overcharges to users' accounts and six documents are related to a variety of other topics. As a result, the user can assign a topic purity score of 70% to the cluster of user documents from which the subset of user documents was selected. In some implementations, the documents can be associated with labels. For example, a document in a cluster can be associated with a label indicating the topic or issue associated with document. The labels can be associated with the documents as a result of being reviewed before clustering or as a result of clustering.

In some implementations, the topic purity score for a cluster associated with label L can be determined using the following equation:

$$\text{Purity}(L) = \text{sum}(\text{Positive}(L))/(\text{Sum}(\text{Positive}(\text{all labels})) + \text{Negative}(L))$$

where Positive(L)=documents in the cluster positively associated with label L, Negative(L)=documents in the cluster known not to have label L and Positive(all labels)=documents in the cluster positively associated with label L or other labels.

In addition, the quality assurance module 112 can determine a confidence interval score associated with each cluster. The confidence interval score can be an indication of the reliability of the topic purity score and can be based on the total number of documents in the subset of user documents, the number of user documents in the subset of user documents that shared the same topic or issue and a distribution curve. If the number of user documents in a cluster is large, then a normal distribution can be used to calculate the confidence interval score. If the number of user documents in a cluster is small, then a binomial distribution can be used to calculate the confidence interval score. In some implementations, a binomial distribution can be used when the number of user documents in a cluster is less than 30, a normal distribution can be used when the number of user documents in a cluster is greater than 60 documents and a t-distribution can be used when the when the number of user documents in a cluster is less than or equal to 60 and greater than or equal to 30. In some implementations, the number of user documents in a cluster can be determined to be large or small based on empirical analysis of the specific data set. Various algorithms can be used to calculate the confidence interval score associated with each cluster. For example, the confidence interval score associated with a cluster of user documents can be calculated using the Adjusted Wald Method.

After the topic purity and confidence interval level is determined for each cluster of user documents, the quality assurance module 112 can determine whether each cluster of user documents satisfies the quality assurance requirement. An example quality assurance requirement can be a requirement that each cluster has a topic purity score of at least 80% and a confidence interval score of at least 80% (e.g., a topic purity requirement of at least 80% and a confidence interval requirement of at least 80%). Other topic purity requirements and confidence interval requirements can be used and can be determined based on system requirements.

In some implementations, the quality assurance module 112 can mark each cluster with a label to indicate whether the cluster satisfied the quality assurance requirement. For example, the quality assurance module 112 can associate a label of "Yes," "Pass," "Good," etc. with a cluster to indicate that the cluster satisfied the quality assurance requirement and a label of "No," "Fail," "Bad," etc. with a cluster to indicate that the cluster did not satisfy the quality assurance requirement. In addition, the quality assurance module 112 can associate a label of "To be reviewed" with a cluster to indicate that the cluster should be further reviewed to determine whether the cluster satisfies the quality assurance requirement. In some implementations, the quality assurance module 112 can label the cluster with the topic purity score and confidence interval score associated with the cluster. In some implementations, the quality assurance module 112 uses metadata to label the cluster.

The scoring module 114 can access the clusters of user documents in the stored documents database 110 or can receive the clusters of user documents from the clustering module 108 or quality assurance module 112. The scoring module 114 can analyze each cluster of user documents and determine a similarity score, which provides an indication or a measure of the similarity of the documents in the cluster. For example, the scoring module 114 can determine a mutual information value associated with each cluster of user documents as the similarity score. The mutual information value can be a probabilistic measure of how many features a user document 104 has in common with the other user documents 104 in the cluster. In some implementations, the mutual information value is a logarithmic function. In some implementations, the mutual information value (MI) is calculated using the following function:

$$MI(t_i, d_j) = \text{sum}(\text{Prob}(t_i, d_j) * \log(\text{Prob}(t_i, d_j)/(\text{Prob}(t_i) * \text{Prob}(d_j))))$$

where t=features in the corpus of user documents represented by the clusters; d=the set of documents in the corpus of user documents represented by the clusters; Prob($t_i$, $d_j$)=the probability distribution of the feature t, in a user document $d_j$; and i=index of keywords; and j=index of document in the corpus of user documents represented by the clusters. The probability distribution of the feature t, in a user document $d_j$ can be ratio of the number of occurrences of the feature t, in the user document $d_j$ to the number of occurrences of the feature $t_i$ in the corpus of user documents. In some implementations, Prob($t_i$, $d_j$) can be calculated using the following function:

$$\text{Prob}(t_i, d_j) = N(t_i, d_j)/N,$$

where N=$\Sigma_{ij}$ N($t_i$, $d_j$) and N($t_i$, $d_j$) is the number of times feature $t_i$ appears in document $d_j$.

The filter 114 can access the clusters of user documents in the stored documents database 110 or receive the clusters of user documents from the quality assurance module 112. The filter 114 can determine values corresponding to a high quality threshold and a low quality threshold based on the similarity scores associated with the clusters of user documents and a quality assurance requirement. For example, the filter 114 can rank the clusters of user documents according the similarity scores associated with each cluster of user documents such that a first cluster is ranked higher than a second cluster if the similarity score associated with the first cluster is greater than the similarity score associated with the second cluster.

It has been observed that the similarity score can be an indication of the topic purity score. For example, a cluster having a low topic purity score (e.g., 30%) can be ranked lower because the cluster will likely have a lower similarity score.

The filter 114 can determine the high quality threshold value. For example, the filter 114 can analyze the clusters of documents in a descending order (e.g., from the highest ranked cluster to the lowest ranked cluster) and determine the ranking of the first cluster that failed the quality assurance requirement. The filter 114 can set the high quality threshold value to be the similarity score associated with the first cluster that failed the quality assurance requirement.

The filter 114 can determine the low quality threshold value by analyzing the clusters of documents in an ascending order (e.g., from the lowest ranked cluster to the highest ranked cluster) and determine the ranking of the first cluster that satisfies the quality assurance requirement. The filter 114 can set the low quality threshold value to be the similarity score associated with the first cluster that satisfies the quality assurance requirement. The filter 114 can store the low quality threshold value and the high quality threshold value.

The filter 114 can determine whether each cluster satisfies the quality assurance requirement by analyzing the label that indicates whether the cluster satisfied the quality assurance requirement. For example, the filter 114 can determine whether a cluster satisfied the quality assurance requirement by determining whether the label is equal to "Yes" or "No." In some implementations, the filter 114 can determine whether a cluster satisfied the quality assurance requirement by analyzing the topic purity score and the confidence interval score to determine whether the cluster satisfied the quality assurance requirement.

FIG. 2 provides an example ranking of clusters 200. As illustrated in FIG. 2, the ranking of clusters 200 is organized in a descending order according to the similarity score associated with each cluster. For example, Cluster 145 is associated with the largest similarity score and is ranked highest, and Cluster 4 is associated with the smallest similarity score and is ranked lowest.

Starting at Cluster 145, the filter 114 can analyze the labels associated with each cluster in a descending order to determine whether the cluster satisfied the quality assurance requirement. Because Cluster 140 is the first cluster that failed the quality assurance requirement, the filter 114 can determine that the high quality threshold value is equal to the similarity score associated with Cluster 140 (e.g., high quality threshold=1.792328).

Starting at Cluster 4, the filter 114 can analyze the labels associated with each cluster in an ascending order to determine whether the cluster satisfied the quality assurance requirement. Because Cluster 90 is the first cluster that satisfied the quality assurance requirement (i.e., did not fail the quality assurance requirement), the filter 114 can determine that the low quality threshold value is equal to the similarity score associated with Cluster 90 (e.g., low quality threshold value=1.791138).

Returning to FIG. 1, the filter 116 can provide the low quality threshold value and the high quality threshold value to the quality assurance module 112. The quality assurance module 112 can use the threshold values to reduce the number of clusters that need to be reviewed. For example, after a new set of user documents 104 (e.g., a set of user documents that are different from the user documents used to generate the low quality threshold value and the high quality threshold value) is clustered by the clustering module 108, the quality assurance module 112 can determine the similarity scores associated with each of the newly formed clusters and compare the similarity scores to the high quality and/or low quality threshold values. For example, if the similarity score associated with a cluster is greater than the high quality threshold value, the quality assurance module 112 can automatically determine that the cluster satisfies the quality assurance requirement without determining the topic purity score and confidence interval score associated with the cluster. Similarly, if the similarity score associated with a cluster is less than the low quality threshold value, the quality assurance module 112 can automatically determine that the cluster fails the quality assurance requirement without determining the topic purity score and confidence interval score associated with the cluster. If the similarity score associated with a cluster is less than or equal to the high quality threshold and greater than or equal to the low quality threshold, the quality assurance module 112 can calculate the topic purity score and confidence interval score associated with the cluster to determine whether the cluster satisfies the quality assurance requirement. The quality assurance module 112 can mark these clusters with a label to indicate that these clusters should be further reviewed to determine whether the clusters satisfy the quality assurance requirement.

In some implementations, the quality assurance module 112 ranks the new clusters according to the similarity score associated with each cluster and then automatically determines which of the clusters satisfy the quality assurance requirement and automatically determines which of the clusters fail the quality assurance requirement. For example, the quality assurance module 112 can rank the clusters in a descending order and determine that all the clusters having a similarity score greater than the high quality threshold value satisfy the quality assurance requirement without first determining the topic purity scores and confidence interval scores. Similarly, the quality assurance module 112 can determine that all the clusters having a similarity score less than the low quality threshold value do not satisfy the quality assurance requirement without first determining the topic purity scores and confidence interval scores.

Figure 3:
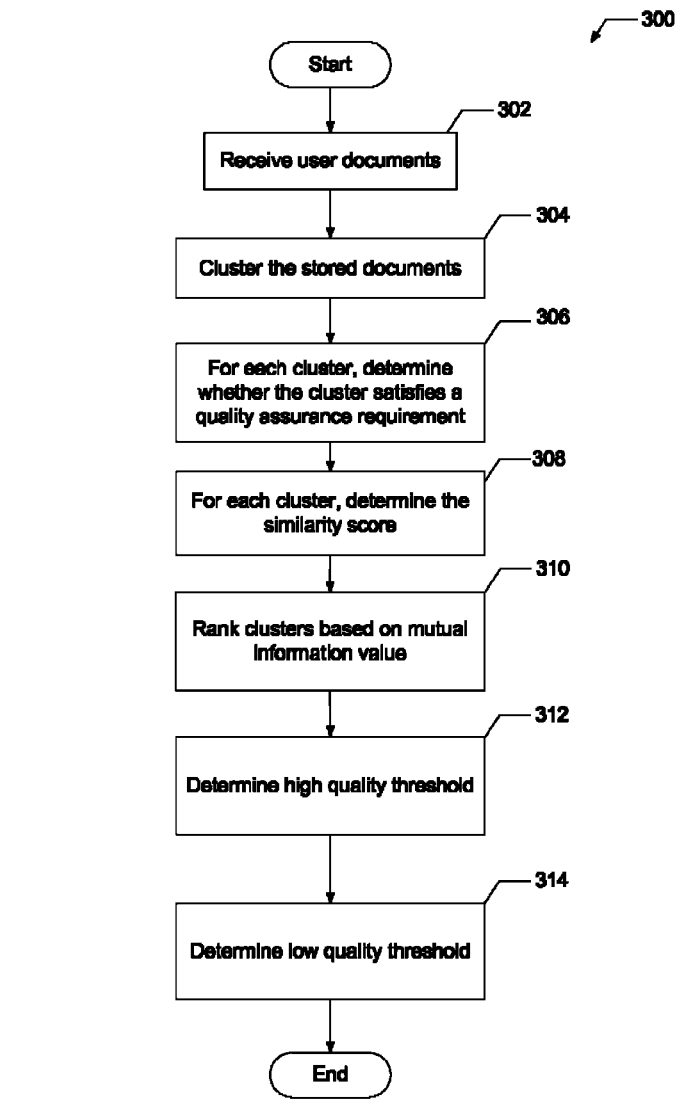
FIG. 3 is a flowchart of an example process to determine threshold values.

FIG. 3 is a flowchart of an example process 300 to determine threshold values. Process 300 begins by receiving user documents (at 302). For example, the clustering module 108 can receive user documents 104 over a period of time (e.g., a day, a week, a month, etc.). The clustering module 108 can store the user of documents 104 in the stored documents database 110.

The corpus of stored user documents can be clustered (at 304). For example, the clustering module 108 can access the stored documents database 110 and analyze the user documents 104 to identify similarities among the documents and group the user documents according to the identified similarities. In some implementations, the clustering module 108 can attempt to group user documents 104 in various groupings until an optimal or near optimal grouping is identified. For example, the clustering module 108 can attempt to group the user documents 104 such that substantially all the user documents in a particular cluster are related to or describe a similar topic or issue (e.g., 85%, 95% of the documents are related to the same issue).

In some implementations, the clustering module 108 can identify a feature set or keyword set before clustering the user documents 104. For example, the clustering module 108 can determine a feature set based on a domain-specific dictionary derived from documents corresponding to the domain (e.g., technical support manuals, billing support documents, etc.). In some implementations, an information retrieval/text mining algorithm, e.g., a term frequency-inverse document frequency algorithm can be applied to the user documents 104 to identify statistically relevant features before clustering the user documents 104.

For each cluster, the quality assurance module can determine whether the cluster satisfies a quality assurance requirement (at 306). For example, the quality assurance module 112 can randomly or pseudo-randomly select a subset of documents from a cluster of user documents. The subset of documents can include a predetermined number of documents (e.g., 20, 40, 100, etc.) or a predetermined percentage of the total number of documents in the cluster (e.g., 20%, 40%, etc.). In some implementations, a user interacting with the quality assurance module 108 or the document organization system 107 can analyze the user documents in the subset of documents and determine a topic purity score associated with the cluster. For example, the user can analyze each user document 104 in the subset of documents and determine the percentage of the user documents 104 that are related to the same topic or issue.

The quality assurance module 108 can determine the confidence interval score associated with the cluster. The confidence interval score can be an indication of the reliability of the topic purity score and can be based on the number of documents in the subset of user documents, the number of user documents in the subset of user documents that agreed on the same topic or issue and a distribution curve (e.g., a normal distribution or a beta distribution). Various algorithms can be used to calculate confidence interval score associated with each cluster. For example, the confidence interval score associated with the cluster of user documents can be calculated using the Adjusted Wald Method.

After the topic purity score and the confidence interval score are determined, the quality assurance module 112 can determine whether the cluster of user documents satisfies the quality assurance requirement. An example quality assurance requirement can be a requirement that each cluster has a topic purity score of at least 80% and a confidence interval score of at least 80%. Other topic purity requirements and confidence interval requirements can be used and can be determined based on system requirements.

The quality assurance module 112 can mark the cluster with a label to indicate whether the cluster satisfied the quality assurance requirement. For example, the quality assurance module 112 can associate a label of "Yes" or "No" to the cluster. The quality assurance module 108 can analyze each cluster and determine whether each cluster satisfies the quality assurance requirement.

The scoring module can determine a similarity score for each of the clusters (at 308). For example, the scoring module 114 can analyze each cluster of user documents and determine a similarity score that can provide an indication or a measure of the similarity of the documents in the cluster. For example, the scoring module 114 can determine a mutual information value associated with each cluster of user documents. The mutual information value can be a probabilistic measure of how many features a user document 104 has in common with the other user documents 104 in the cluster. In some implementations, the mutual information value is a logarithmic function.

After the similarity score is determined for each of the clusters, the filter can rank the clusters based on the similarity scores associated with each of the clusters (at 310). For example, the filter 114 can rank the clusters of user documents in a descending order according the similarity scores associated with each cluster of user documents.

After the clusters are ranked, the filter can determine a high quality threshold value (at 312). For example, the filter 114 can analyze the clusters of documents in a descending order (e.g., from the highest ranked cluster to the lowest ranked cluster) and determine the ranking of the first cluster that failed the quality assurance requirement. The filter 114 can base the high quality threshold value on the similarity score associated with the first cluster that failed the quality assurance requirement.

The filter can determine a low quality threshold value (at 314). For example, the filter 114 can determine the low quality threshold value by analyzing the clusters of documents in an ascending order (e.g., from the lowest ranked cluster to the highest ranked cluster) and determine the ranking of the first cluster that satisfies the quality assurance requirement. The filter 114 can base the low quality threshold value on the similarity score associated with the first cluster that satisfies the quality assurance requirement.

Figure 4:
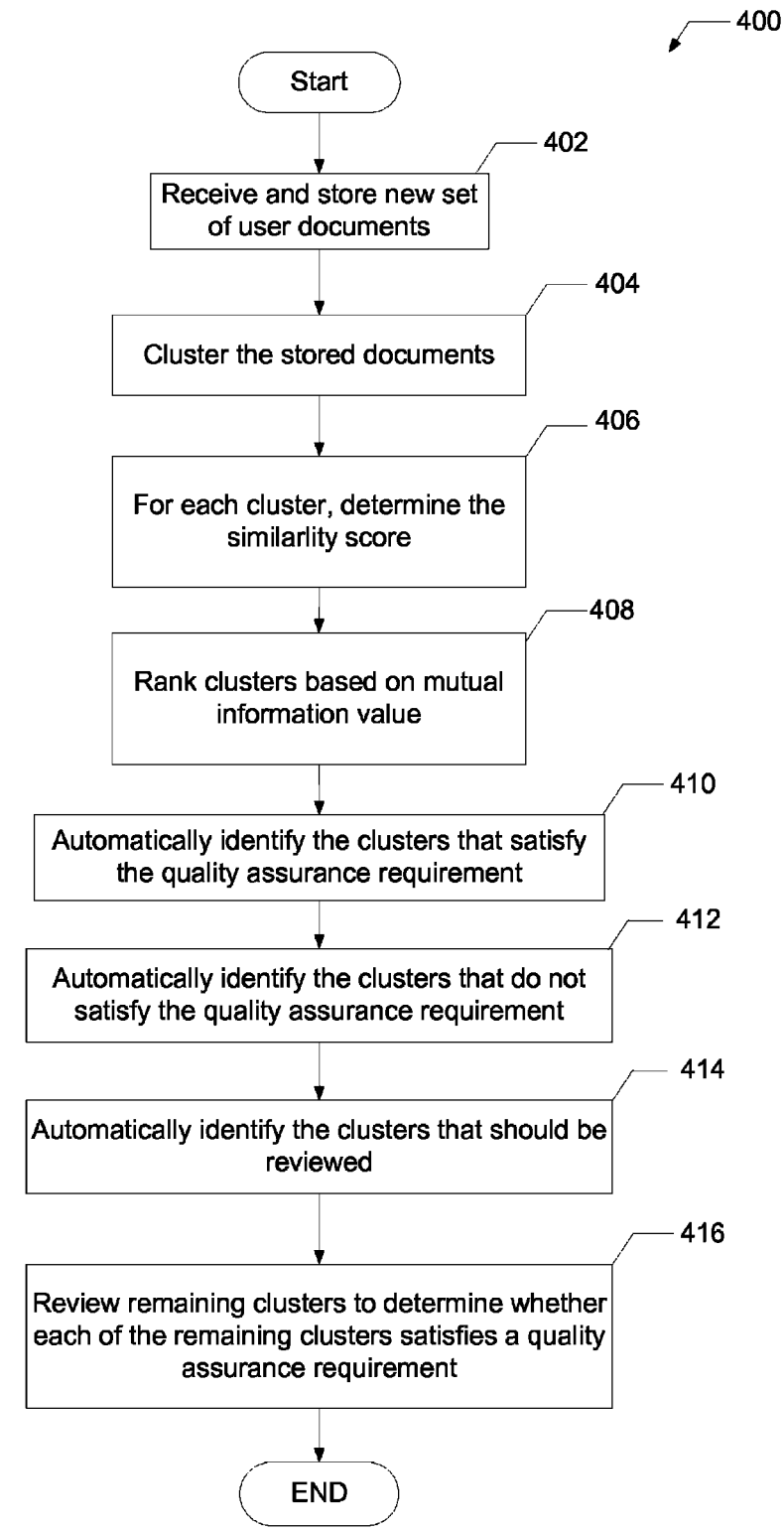
FIG. 4 is a flowchart of an example process to cluster and review documents.

FIG. 4. is a flowchart of an example process 400 to cluster and review documents. The process 400 begins by receiving user documents from user devices (at 402). For example, the clustering module 108 can receive the new user documents 104 over a period of time (e.g., a day, a week, a month, etc.). The new user documents 104 are different from the user documents 104 used to determine the high quality and low quality threshold values described above in connection with FIG. 3. The clustering module 108 can store the user of documents 104 in the stored documents database 110.

The corpus of user documents can be clustered (at 404). For example, the corpus of user documents can be clustered similar to the process described above in connection with FIG. 3 (at 404). Similarly, the similarity score for each cluster can be calculated similar to the process described above in connection with FIG. 3 (at 406).

After the similarity score is determined for each cluster, the filter can rank the clusters according to the similarity score (at 408). For example, the filter 114 can rank the clusters in a descending order based on the similarity scores associated with the clusters.

The quality assurance module can then automatically identify the clusters that satisfy the quality assurance requirement (at 410). For example, the quality assurance module 112 can analyze the similarity score associated with each cluster to automatically determine whether or not the cluster satisfies the quality assurance requirement. The quality assurance module 112 can analyze the ranked clusters in a descending order (e.g., analyze the highest ranked cluster first) and compare the similarity score to the high quality threshold. If the similarity score is greater than the high quality threshold value, then the quality assurance module 112 can determine that the cluster satisfies the quality assurance requirement. The quality assurance module 112 can mark or label each cluster with an appropriate label (e.g., "Yes," "Passed," "Good," etc.) after determining that the cluster is associated with a similarity score greater than the high quality threshold. The quality assurance module 112 can stop analyzing clusters in a descending order after the quality assurance module identifies the first cluster associated with a similarity score less than or equal to the high quality threshold.

The quality assurance module can then automatically identify the clusters that fail the quality assurance requirement (at 412). For example, after identifying the first cluster associated with a similarity score less than or equal to the high quality threshold, the quality assurance module 112 can analyze the ranked clusters in an ascending order (e.g., analyze the lowest ranked cluster first) and compare the similarity score associated with each cluster to the low quality threshold. If the similarity score is less than the low quality threshold, the quality assurance module 112 can determine that the cluster does not satisfy the quality assurance requirement. The quality assurance module 112 can mark or label each cluster with an appropriate label indicating that the cluster failed the quality assurance requirement (e.g., "No," "Failed," "Bad," etc.). The quality assurance module 112 can stop analyzing clusters in an ascending order after it identifies the first cluster associated with a similarity score greater than or equal to the low quality threshold.

Although FIG. 4 describes the process 400 as identifying the clusters that satisfy the quality assurance requirement (at 410) and then identifying the clusters that do not satisfy the quality assurance requirement (at 412), the order of these steps can be changed. For example, the clusters that do not satisfy the quality assurance requirement can be identified and then the clusters that satisfy the quality assurance requirement can be identified. In some implementations, the clusters that satisfy the quality assurance requirement and the clusters that do not satisfy the quality assurance requirement can be identified in parallel.

After identifying the clusters that satisfy the quality assurance requirement (at 410) and the clusters that do not satisfy the quality assurance requirement (at 412), the quality assurance module can identify the remaining clusters as clusters that should be further reviewed (at 414). For example, the quality assurance module 112 can mark or label the clusters associated with a similarity score that is less than or equal to the high quality threshold and is greater than or equal to the low quality threshold as clusters that should be further reviewed to determine whether the cluster satisfies the quality assurance requirement.

Each of the remaining clusters can be analyzed to determine whether the each of the remaining clusters satisfy the quality assurance requirement (at 416). For example, a the quality assurance module 112 or the document organization system 107 can determine whether each cluster satisfies the quality assurance requirement as explained above in connection with FIG. 3 (e.g., reference 306 in FIG. 3).

Figure 5:
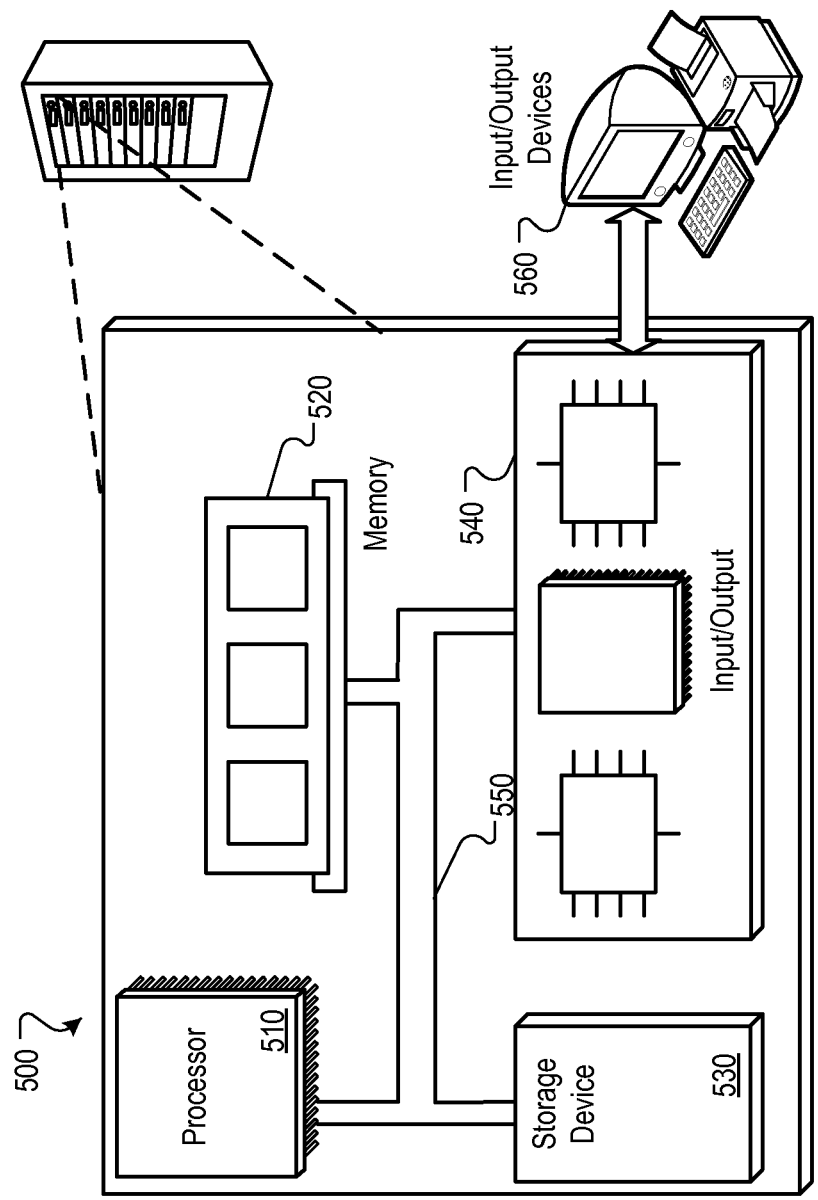
FIG. 5 is a block diagram of an example computer system that can be used to implement the clustering system.

FIG. 5 is block diagram of an example computer system 500 that can be used to implement the document organization system 107. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530. In some implementations, the system 500 includes multiple processors 510 each capable of processing instructions for execution within the system 500.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., an IEEE 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

The various functions of the document organization system 107 can be realized by instructions that upon execution cause one or more processing devices to carry out the processes and functions described above. Such instructions can comprise, for example, interpreted instructions, such as script instructions, e.g., JavaScript™ or ECMAScript instructions, or executable code, or other instructions stored in a computer readable medium. The document organization system 107 can be distributively implemented over a network, such as a server farm, or can be implemented in a single computer device.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). In some implementations, the computer storage medium is a non-transitory medium.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Although a few implementations have been described in detail above, other modifications are possible. Moreover, other processes for determining whether a cluster satisfies the quality assurance requirement can be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method comprising:
receiving a set of clusters of documents;
for each cluster in the set of clusters, calculating a similarity score for the cluster wherein the similarity score is based at least in part on features included in the documents in the cluster and indicates a measure of similarity of the documents in the cluster;
for each cluster associated with a respective similarity score greater than a first threshold, identifying the cluster as satisfying a quality assurance requirement;
for each cluster associated with a respective similarity score less than a second threshold, identifying the cluster as failing the quality assurance requirement, wherein the second threshold is less than the first threshold;
for each cluster associated with a similarity score less than or equal to the first threshold value and greater than or equal to the second threshold value, reviewing at least a subset of documents in the cluster to determine whether the cluster satisfies the quality assurance requirement; and
associating a label with each cluster in the set of clusters, wherein the label indicates whether the cluster satisfied the quality assurance requirement.

2. The method of claim 1 further comprising:
ranking the set of clusters based on the similarity scores associated with the clusters before identifying the clusters as satisfying the quality assurance requirement and before identifying the clusters as failing the quality assurance requirement.

3. The method of claim 1 wherein identifying the cluster as satisfying the quality assurance requirement comprises identifying the cluster as satisfying the quality assurance requirement without reviewing a subset of documents in the cluster to identify the cluster as satisfying the quality assurance requirement.

4. The method of claim 1 wherein identifying the cluster as failing the quality assurance requirement comprises identifying the cluster as failing the quality assurance requirement without reviewing a subset of documents in the cluster to identify the cluster as failing the quality assurance requirement.

5. The method of claim 1 wherein reviewing at least a subset of documents in the cluster to determine whether the cluster satisfies the quality assurance requirement comprises:
determining a topic purity score and a confidence interval score associated with the cluster, wherein the topic purity score is based at least in part on the subset of documents in the cluster and comprises a percentage of the documents in the cluster that are related to the same topic and wherein the confidence interval score is based at least in part on the subset of documents and comprises an indication of the reliability of the topic purity score.

6. The method of claim 5 wherein the quality assurance requirement comprises a topic purity requirement and a confidence interval requirement and wherein reviewing at least a subset of documents in the cluster to determine whether the cluster satisfies the quality assurance requirement further comprises:
comparing the topic purity score associated with the cluster and the confidence interval score associated with the cluster to the topic purity requirement and the confidence interval requirement, respectively, to determine whether the cluster satisfies the quality assurance requirement.

7. The method of claim 6 wherein the topic purity requirement is substantially 80% and the confidence interval requirement is substantially 80%.

8. The method of claim 1 further comprising:
prior to receiving the set of clusters of documents, determining the first and second thresholds, wherein determining the first and second thresholds comprises:
receiving a second set of clusters of documents;
for each cluster in the second set of clusters:
determining the topic purity score and the confidence level associated with the cluster, wherein the topic purity score comprises a percentage of the documents in the cluster that are related to the same topic and wherein the confidence interval score comprises an indication of the reliability of the topic purity score; and
for each cluster, calculating a similarity score based at least in part on features included in the documents;
ranking the second set of clusters based on the similarity score;
analyzing the second set of clusters in a descending order to determine the first threshold value, wherein the first threshold value corresponds to a similarity score associated with a first cluster that fails the quality assurance requirement; and
analyzing the second set of clusters in an ascending order to determine the second threshold value, wherein the second threshold value corresponds to a similarity score associated with the first cluster that satisfies the quality assurance requirement.

9. A system comprising:
memory; and
one or more processors coupled to the memory, wherein the memory stores instructions operable, when executed by the one or more processors, to cause the one or more processors to perform operations comprising:
receiving a set of clusters of documents;
for each cluster in the set of clusters, calculating a similarity score for the cluster wherein the similarity score is based at least in part on features included in the documents in the cluster and indicates a measure of similarity of the documents in the cluster;
for each cluster associated with a respective similarity score greater than a first threshold, identifying the cluster as satisfying a quality assurance requirement;
for each cluster associated with a respective similarity score less than a second threshold, identifying the cluster as failing the quality assurance requirement, wherein the second threshold is less than the first threshold;

for each cluster associated with a similarity score less than or equal to the first threshold value and greater than or equal to the second threshold value, reviewing at least a subset of documents in the cluster to determine whether the cluster satisfies the quality assurance requirement; and associating a label with each cluster in the set of clusters, wherein the label indicates whether the cluster satisfied the quality assurance requirement.

10. The system of claim 9 wherein the operations further comprise:

ranking the set of clusters based on the similarity scores associated with the clusters before identifying the clusters as satisfying the quality assurance requirement and before identifying the clusters as failing the quality assurance requirement.

11. The system of claim 9 wherein identifying the cluster as satisfying the quality assurance requirement comprises identifying the cluster as satisfying the quality assurance requirement without reviewing a subset of documents in the cluster to identify the cluster as satisfying the quality assurance requirement.

12. The system of claim 9 wherein identifying the cluster as failing the quality assurance requirement comprises identifying the cluster as failing the quality assurance requirement without reviewing a subset of documents in the cluster to identify the cluster as failing the quality assurance requirement.

13. The system of claim 9 wherein reviewing at least a subset of documents in the cluster to determine whether the cluster satisfies the quality assurance requirement comprises:

determining a topic purity score and a confidence interval score associated with the cluster, wherein the topic purity score is based at least in part on the subset of documents in the cluster and comprises a percentage of the documents in the cluster that are related to the same topic and wherein the confidence interval score is based at least in part on the subset of documents and comprises an indication of the reliability of the topic purity score.

14. The system of claim 13 wherein the quality assurance requirement comprises a topic purity requirement and a confidence interval requirement and wherein reviewing at least a subset of documents in the cluster to determine whether the cluster satisfies the quality assurance requirement further comprises:

comparing the topic purity score associated with the cluster and the confidence interval score associated with the cluster to the topic purity requirement and the confidence interval requirement, respectively, to determine whether the cluster satisfies the quality assurance requirement.

15. The system of claim 14 wherein the topic purity requirement is substantially 80% and the confidence interval requirement is substantially 80%.

16. The system of claim 9 wherein the operations further comprise:

prior to receiving the set of clusters of documents, determining the first and second thresholds, wherein determining the first and second thresholds comprises:

receiving a second set of clusters of documents;

for each cluster in the second set of clusters:

determining the topic purity score and the confidence level associated with the cluster, wherein the topic purity score comprises a percentage of the documents in the cluster that are related to the same topic and wherein the confidence interval score comprises an indication of the reliability of the topic purity score; and for each cluster, calculating a similarity score based at least in part on features included in the documents;

ranking the second set of clusters based on the similarity score;

analyzing the second set of clusters in a descending order to determine the first threshold value, wherein the first threshold value corresponds to a similarity score associated with a first cluster that fails the quality assurance requirement; and analyzing the second set of clusters in an ascending order to determine the second threshold value, wherein the second threshold value corresponds to a similarity score associated with the first cluster that satisfies the quality assurance requirement.

17. A non-transitory computer-readable storage device storing a computer program product, the computer program product having instructions operable to cause one or more data processing apparatus to perform operations comprising:

receiving a set of clusters of documents;

for each cluster in the set of clusters, calculating a similarity score for the cluster wherein the similarity score is based at least in part on features included in the documents in the cluster and indicates a measure of similarity of the documents in the cluster;

for each cluster associated with a respective similarity score greater than a first threshold, identifying the cluster as satisfying a quality assurance requirement;

for each cluster associated with a respective similarity score less than a second threshold, identifying the cluster as failing the quality assurance requirement, wherein the second threshold is less than the first threshold;

for each cluster associated with a similarity score less than or equal to the first threshold value and greater than or equal to the second threshold value, reviewing at least a subset of documents in the cluster to determine whether the cluster satisfies the quality assurance requirement; and associating a label with each cluster in the set of clusters, wherein the label indicates whether the cluster satisfied the quality assurance requirement.

18. The non-transitory computer-readable storage device of claim 17 wherein operations further comprise:

ranking the set of clusters based on the similarity scores associated with the clusters before identifying the clusters as satisfying the quality assurance requirement and before identifying the clusters as failing the quality assurance requirement.

19. The non-transitory computer-readable storage device of claim 17 wherein identifying the cluster as satisfying the quality assurance requirement comprises identifying the cluster as satisfying the quality assurance requirement without reviewing a subset of documents in the cluster to identify the cluster as satisfying the quality assurance requirement.

20. The non-transitory computer-readable storage device of claim 17 wherein identifying the cluster as failing the quality assurance requirement comprises identifying the cluster as failing the quality assurance requirement without reviewing a subset of documents in the cluster to identify the cluster as failing the quality assurance requirement.

21. The non-transitory computer-readable storage device of claim 17 wherein reviewing at least a subset of documents in the cluster to determine whether the cluster satisfies the quality assurance requirement comprises:

determining a topic purity score and a confidence interval score associated with the cluster, wherein the topic purity score is based at least in part on the subset of documents in the cluster and comprises a percentage of the documents in the cluster that are related to the same topic and wherein the confidence interval score is based at least in part on the subset of documents and comprises an indication of the reliability of the topic purity score.

22. The non-transitory computer-readable storage device of claim 21 wherein the quality assurance requirement comprises a topic purity requirement and a confidence interval requirement and wherein reviewing at least a subset of documents in the cluster to determine whether the cluster satisfies the quality assurance requirement further comprises:

comparing the topic purity score associated with the cluster and the confidence interval score associated with the cluster to the topic purity requirement and the confidence interval requirement, respectively, to determine whether the cluster satisfies the quality assurance requirement.

23. The non-transitory computer-readable storage device of claim 22 wherein the topic purity requirement is substantially 80% and the confidence interval requirement is substantially 80%.

24. The non-transitory computer-readable storage device of claim 17 wherein the operations further comprise:

prior to receiving the set of clusters of documents, determining the first and second thresholds, wherein determining the first and second thresholds comprises:

receiving a second set of clusters of documents;

for each cluster in the second set of clusters:

determining the topic purity score and the confidence level associated with the cluster, wherein the topic purity score comprises a percentage of the documents in the cluster that are related to the same topic and wherein the confidence interval score comprises an indication of the reliability of the topic purity score; and for each cluster, calculating a similarity score based at least in part on features included in the documents;

ranking the second set of clusters based on the similarity score;

analyzing the second set of clusters in a descending order to determine the first threshold value, wherein the first threshold value corresponds to a similarity score associated with a first cluster that fails the quality assurance requirement; and analyzing the second set of clusters in an ascending order to determine the second threshold value, wherein the second threshold value corresponds to a similarity score associated with the first cluster that satisfies the quality assurance requirement.

* * * * *